(12) United States Patent
Pandya et al.

(10) Patent No.: US 7,860,802 B2
(45) Date of Patent: Dec. 28, 2010

(54) FLEXIBLE LICENSING ARCHITECTURE IN CONTENT RIGHTS MANAGEMENT SYSTEMS

(75) Inventors: Ravindra Nath Pandya, Clyde Hill, WA (US); Peter David Waxman, Seattle, WA (US); Vinay Krishnaswamy, Woodinville, WA (US); Muthukrishnan Paramasivam, Seattle, WA (US); Marco A. DeMello, Redmond, WA (US); Steven Bourne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 11/048,087

(22) Filed: Feb. 1, 2005

(65) Prior Publication Data

US 2006/0173788 A1    Aug. 3, 2006

(51) Int. Cl.
G06F 21/00    (2006.01)
(52) U.S. Cl. .............................. 705/59; 705/50; 705/51; 705/57; 713/156; 713/157
(58) Field of Classification Search ................... 705/59, 705/50–51, 57; 713/156, 157
See application file for complete search history.

(56) References Cited

U.S. PATENT DOCUMENTS

| | | | |
|---|---|---|---|
| 6,226,618 B1 * | 5/2001 | Downs et al. ................... 705/1 |
| 6,243,480 B1 * | 6/2001 | Zhao et al. ................... 382/100 |
| 2002/0006204 A1 * | 1/2002 | England et al. .............. 380/269 |
| 2002/0007456 A1 * | 1/2002 | Peinado et al. .............. 713/164 |
| 2002/0012432 A1 * | 1/2002 | England et al. .............. 380/231 |
| 2002/0013772 A1 * | 1/2002 | Peinado ........................ 705/51 |
| 2002/0019814 A1 * | 2/2002 | Ganesan ....................... 705/59 |
| 2002/0099663 A1 * | 7/2002 | Yoshino et al. ............... 705/65 |
| 2002/0136407 A1 * | 9/2002 | Denning et al. ............. 380/258 |
| 2002/0138735 A1 * | 9/2002 | Felt et al. ..................... 713/176 |
| 2002/0141582 A1 * | 10/2002 | Kocher et al. ............... 380/201 |
| 2002/0146121 A1 * | 10/2002 | Cohen ......................... 380/201 |
| 2002/0169974 A1 * | 11/2002 | McKune ...................... 713/200 |
| 2003/0007646 A1 | 1/2003 | Hurst et al. .................. 380/285 |
| 2003/0014655 A1 * | 1/2003 | England et al. ............. 713/200 |

(Continued)

OTHER PUBLICATIONS

"portion." Collins English Dictionary. London: Collins, 2000. Credo Reference [online][retrieved on Jun. 5, 2009]. Retrieved from: <http://www.credoreference.com/entry/hcengdict/portion>.*

(Continued)

Primary Examiner—Andrew J. Fischer
Assistant Examiner—Monica Mandel
(74) Attorney, Agent, or Firm—Woodcock Washburn LLP

(57) ABSTRACT

A license is issued to a user as decryption and authorization portions. The decryption portion is accessible only by such user and has a decryption key (KD) for decrypting corresponding encrypted digital content and validating information including an identification of a root trust authority. The authorization portion sets forth rights granted in connection with the digital content and conditions that must be satisfied to exercise the rights granted, and has a digital signature that is validated according to the identified root trust authority in the decryption portion. The user issued accesses the decryption portion and employs the validation information therein to validate the digital signature of the authorization portion. If the conditions in the authorization portion so allow, the rights in the authorization portion are exercised by decrypting the encrypted content with the decryption key (KD) from the decryption portion and rendering the decrypted content.

13 Claims, 6 Drawing Sheets

U.S. PATENT DOCUMENTS

| | | | |
|---|---|---|---|
| 2003/0028488 A1* | 2/2003 | Mohammed et al. | 705/59 |
| 2003/0078853 A1* | 4/2003 | Peinado et al. | 705/26 |
| 2003/0081785 A1* | 5/2003 | Boneh et al. | 380/277 |
| 2003/0084306 A1* | 5/2003 | Abburi et al. | 713/188 |
| 2003/0182236 A1 | 9/2003 | Tanaka et al. | 705/51 |
| 2003/0187801 A1* | 10/2003 | Chase et al. | 705/59 |
| 2003/0194092 A1* | 10/2003 | Parks et al. | 380/281 |
| 2003/0195855 A1* | 10/2003 | Parks et al. | 705/51 |
| 2003/0217011 A1* | 11/2003 | Peinado et al. | 705/59 |
| 2003/0233573 A1* | 12/2003 | Phinney | 713/200 |
| 2003/0236978 A1* | 12/2003 | Evans et al. | 713/164 |
| 2004/0001594 A1* | 1/2004 | Krishnaswamy et al. | 380/277 |
| 2004/0027377 A1 | 2/2004 | Hays et al. | |

OTHER PUBLICATIONS

Jones, B.L., "Mobile/PocketPC Development Jump Start", www.developer.com/ws/other/archives.php, Retrieved from the Internet Oct. 27, 2007, 17 pages.

Sun Microsystems, User's Guide Wireless Toolkit, Version 2.1, Java(tm) Platform Micro Edition, Dec. 2003, 1-89.

* cited by examiner

FLEXIBLE LICENSING ARCHITECTURE IN CONTENT RIGHTS MANAGEMENT SYSTEMS

TECHNICAL FIELD

The present invention relates to a rights management (RM) system whereby access to digital content is provided only in accordance with a corresponding digital license. More particularly, the invention relates to a particular licensing architecture employed in connection with such RM system, whereby each license may be tied to one or more root trust authorities and each license may actually comprise a plurality of license documents.

BACKGROUND OF THE INVENTION

Rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders the digital content with the aid of appropriate rendering software such as an audio player, a text displayer, etc. on a personal computer or other hardware.

In one scenario, a content owner or rights-owner such as an author, a publisher, a broadcaster, etc., wishes to distribute such digital content to each of many users or recipients in exchange for a license fee or some other consideration. In such scenario, then, the content may be an audio recording, a multimedia presentation, etc., and the purpose of the distribution is to generate the license fee. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be rendered only a limited number of times, only for a certain total time, only on a certain type of machine, only on a certain type of rendering platform, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to redistribute such digital content in an unwelcome manner. However, such a promise is easily made and easily broken. A content owner/developer may attempt to prevent such redistribution through any of several known security devices, usually involving encryption and decryption. However, there is likely very little that prevents a mildly determined user from decrypting encrypted digital content, saving such digital content in an un-encrypted form, and then re-distributing same.

RM and enforcement architectures and methods have thus been provided to allow the controlled rendering of arbitrary forms of digital content, where such control is flexible and definable by the content owner/developer of such digital content. Such architectures allow and facilitate such controlled rendering in either scenario as set forth above.

Typically, a digital license is tied to a global or near-global root trust authority, for example by way of a chain of digital certificates, and thus any entity that wishes to authenticate/verify such license must be in possession of appropriate information relating to such root trust authority. However, and as should be appreciated, situations can occur where an entity through no fault of its own is not in fact in possession of such appropriate information and therefore cannot so authenticate/verify the license. For one example, the information may have changed since the entity received a copy. For another example, the root trust authority may have changed.

In either example, it should be evident that having the entity rely on any particular root trust authority without regard for any other root trust authority is fraught with danger. In essence, the entity always relies on the particular root trust authority and the information thereof, even when other root trust authorities exist are come into existence, and even if the particular root trust authority goes out of existence.

Accordingly, a need exists for a more flexible architecture for defining digital licenses and the operation thereof. In particular, a need exists for such an architecture that allows for multiple root trust authorities and that allows a license to itself specify each root trust authority that can be employed to authenticate/verify same. Moreover, to effectuate such architecture, a need exists for a new type of license that comprises a plurality of license documents.

SUMMARY OF THE INVENTION

The aforementioned needs are satisfied at least in part by the present invention in which a digital license authorizes rendering of a corresponding piece of digital content on a computing device, where the content is in an encrypted form and is decryptable according to a decryption key (KD). The license is issued to a user and has a decryption portion and an authorization portion.

The decryption portion is accessible only by the user to whom the license is issued and has the decryption key (KD) and validating information including an identification of a root trust authority. The authorization portion sets forth rights granted in connection with the digital content and conditions that must be satisfied to exercise the rights granted, and has a digital signature that is validated according to the identified root trust authority in the decryption portion.

The user to whom the license is issued accesses the decryption portion and employs the validation information therein to validate the digital signature of the authorization portion. Such user exercises the rights in the authorization portion only if the conditions in the authorization portion so allow. The rights are exercised by decrypting the encrypted content with the decryption key (KD) from the decryption portion and rendering the decrypted content. Significantly, the license need not be tied to any particular root trust authority.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
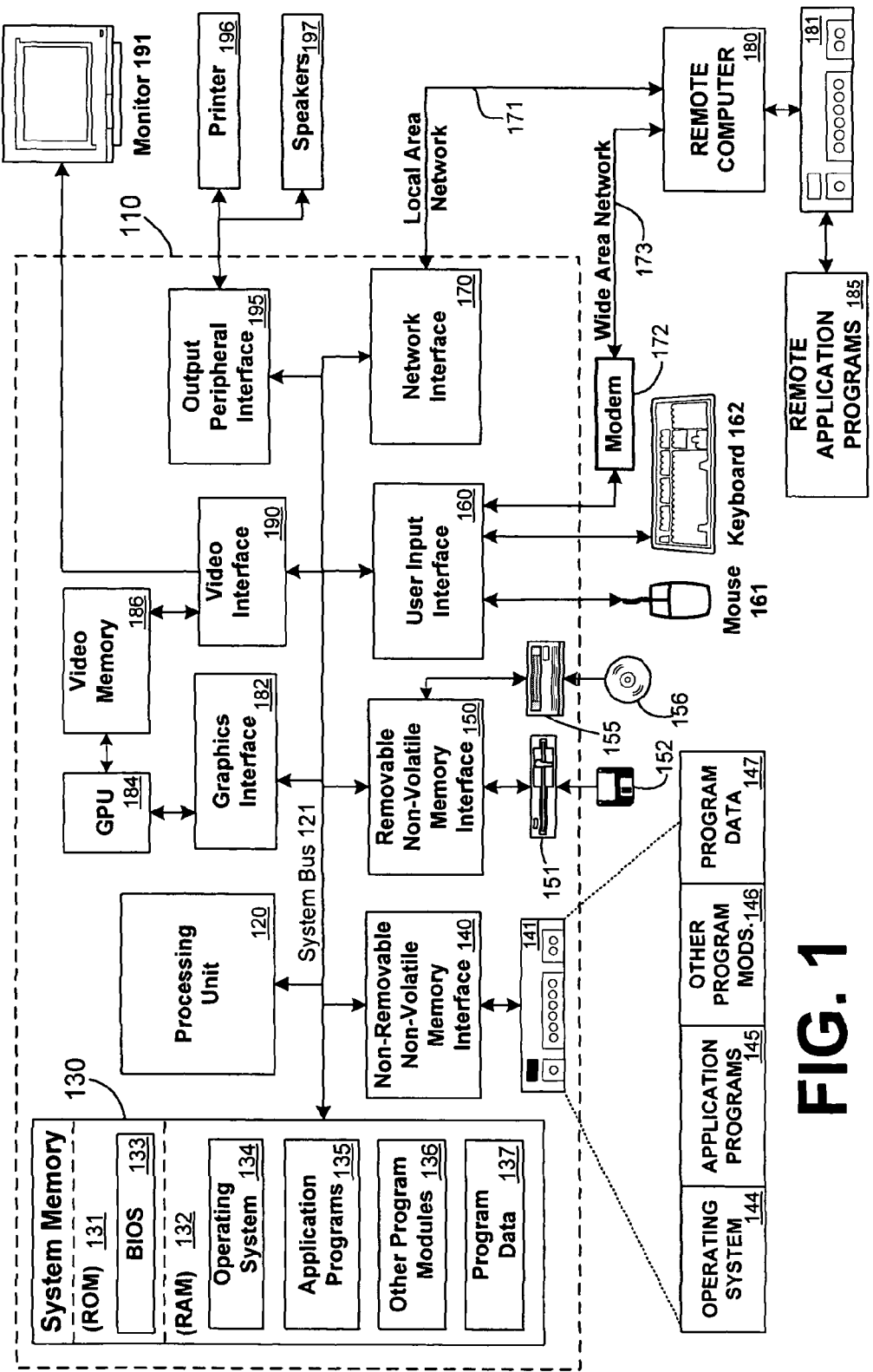
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
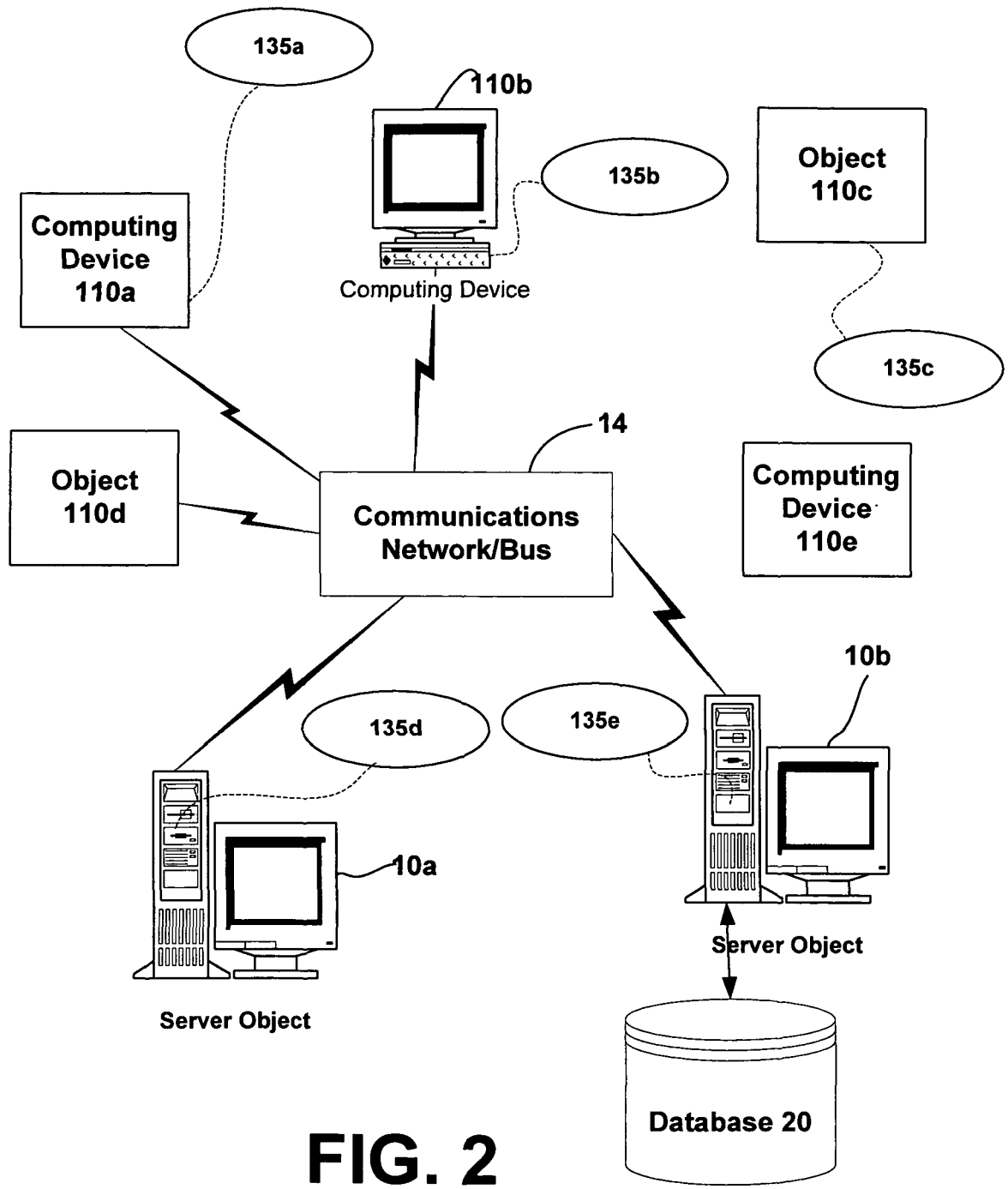
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
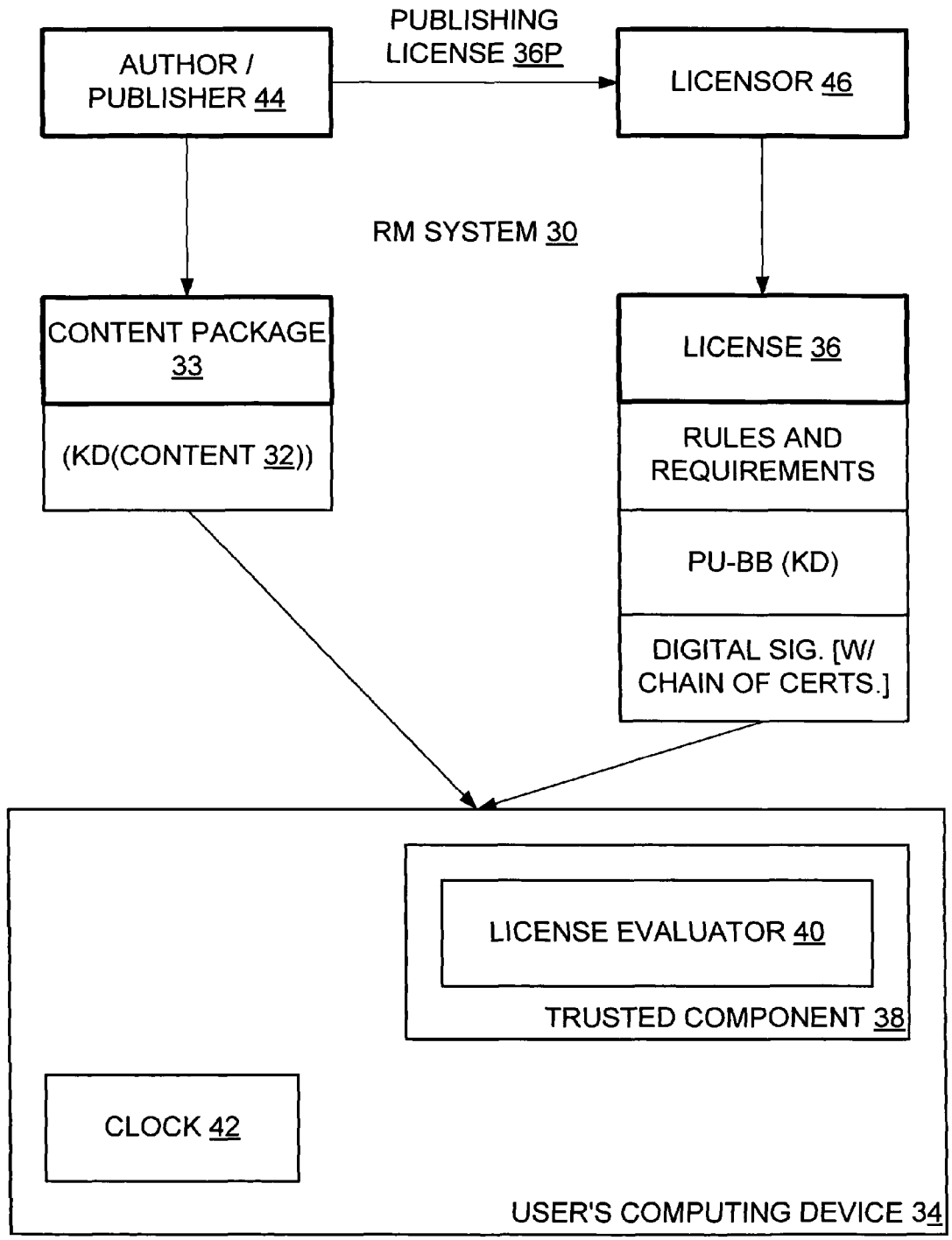
FIG. 3 is a block diagram showing an enforcement architecture of an example of a trust-based system, including a digital license in accordance with one embodiment of the present invention.

As is known, and referring now to FIG. 3, rights management (RM) and enforcement is highly desirable in connection with digital content 32 such as digital audio, digital video, digital text, digital data, digital multimedia, etc., where such digital content 32 is to be distributed to users. Upon being received by the user, such user renders the digital content 32 with the aid of an appropriate rendering device such as a media player, text displayer, etc. on a personal computer 34 or the like.

Typically, a content owner or developer (hereinafter 'owner') distributing such digital content 32 wishes to restrict what the user can do with such distributed digital content 32. For example, the content owner may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, after distribution has occurred, such content owner has very little if any control over the digital content 32. An RM system 30, then, allows the controlled rendering of arbitrary forms of digital content 32, where such control is flexible and definable by the content owner of such digital content. Typically, content 32 is distributed to the user in the form of a package 33 by way of any appropriate distribution channel. The digital content package 33 as distributed may include the digital content 32 encrypted with a symmetric encryption/decryption key (KD), (i.e., (KD(CONTENT))), as well as other information identifying the content, how to acquire a license for such content, etc.

The trust-based RM system 30 allows an owner of digital content 32 to specify license rules that must be satisfied before such digital content 32 is allowed to be rendered on a user's computing device 34. Such license rules can include the aforementioned temporal requirement, and may be embodied within a digital license or use document (hereinafter 'license') 36 that the user/user's computing device 34 (hereinafter, such terms are interchangeable unless circumstances require otherwise) must obtain from the content owner or an agent thereof. Such license 36 also includes the decryption key (KD) for decrypting the digital content, perhaps encrypted according to a key decryptable by the user's computing device 34. As seen in FIG. 3, such encrypting key is a public key of the user's computing device 34 (PU-BB), and the user's computing device 34 presumably has the corresponding private key (PR-BB) by which (PU-BB(KD)) may be decrypted.

The content owner for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 can specify whether the user has rights to render the digital content 32 based on any of several factors, including who the user is, where the user is located, what type of computing device the user is using, what rendering application is calling the RM system 30, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 40 determining that the license 36 is valid and that the user satisfies the rules and requirements therein, the digital content 32 can then be rendered. In particular, to render the content 32, the decryption key (KD) is obtained from the license 36 and is applied to (KD(CONTENT)) from the content package 33 to result in the actual content 32, and the actual content 32 is then in fact rendered.

As set forth above, the license 36 with (PU-BB(KD)) in effect authorizes an entity in possession of (PR-BB) to access (KD) and thereby access the content 32 encrypted according to such (KD), presuming of course that the entity abides by all conditions as set forth in the license 36. As should be appreciated, though, other types of licenses 36 may exists within the RM system 30.

For example, it may be appreciated that in one scenario the author or publisher 44 of the content 32 may authorize a particular licensor 46 to issue a license 36 for corresponding content 32 by providing the licensor 46 with a publishing license 36p. As may be appreciated, such publishing license 36p is similar to the license 36 in that such publishing license 36p likely includes the decryption key (KD) for decrypting the digital content 32, here encrypted according to a public key of the licensor (PU-BB). Likewise, the publishing license 36*p* likely includes the rules and requirements for rendering the content 32. Here, however, such rules and requirements are to be inserted into the license 36 as issued by the licensor 46, and are not especially applicable to such licensor 46.

Note, though, that the publishing license 36*p* may indeed include other rules and requirements that are indeed applicable to the licensor 46. Accordingly, the licensor 46 should include a trusted component 38 with a license evaluator 40 in a manner akin to the user's computing device 34.

Significantly, each type of license 36, 36*p*, etc. as proffered typically includes a digital signature for authentication/verification purposes, and each digital signature is validated with reference to a digital certificate from a root trust authority or a series of such certificates leading back to such a root trust authority. Notably, each certificate includes a digital signature for authentication/verification purposes, and each signature is constructed based on a private key and validated according to a corresponding public key.

As may be appreciated, in a chain of certificates leading from a root trust authority to a particular license 36, 36*p*, etc., the root digital certificate from the root trust authority is signed based on a private key from the root trust authority and is validated based on a corresponding public key which is presumed to be available to the verifying entity. For each other digital certificate in the chain and for the license 36, 36*p*, etc. at the end of the chain, such other certificate or license 36, 36*p*, etc. is signed based on a particular private key and is validated based on a corresponding public key as obtained from the next certificate in the chain toward the root trust authority.

Accordingly, to validate a license 36, 36*p*, etc., a corresponding chain of certificates back to a root trust authority is found, a corresponding public key of such root trust authority is found, and the found public key of the root trust authority is employed to validate the root certificate, and assuming such validation succeeds, a public key is located in the root certificate and employed to validate the next certificate in the chain. The process repeats until the last certificate in the chain at which point a public key is found therein and employed to validate the license 36, 36*p*, etc. Of course, if any validation fails, the process ends and the license 36, 36*p*, etc. is not validated. Typically, unless validated, a RM system 30 will not honor a license 36, 36*p*, etc.

Defining the Root Trust Authority Within a License

As should now be appreciated, validating a license 36, 36*p*, etc. (hereinafter, license 36) requires that a validating entity such as the trusted component 38 already be in possession of the public key of the root trust authority that corresponds to such license 36 as defined by the chain of certificates thereof. However, and as was previously pointed out, situations can occur where an entity through no fault of its own is not in fact in possession of such public key, for any of several reasons. Of course, all certificate chains could lead back to a single global or near-global root trust authority, but such reliance on one or a few roots of authority unnecessarily centralizes such root trust and is problematic should the centralized root trust become compromised or otherwise fails.

Accordingly, in one embodiment of the present invention, a license 36 may define any particular root trust authority by including therewith a public key corresponding thereto, whereby the public key is then employed to start off validating a chain of certificates attached to such license 36. As a result, any validating entity need not already be in possession of any particular public key of any particular root trust authority but instead can obtain such public key based on the corresponding license 36 that ultimately is to be validated based on such public key. Thus, such validating entity is not tied to any particular root trust authority but instead can validate most any license 36 that is tied through a corresponding chain of certificates to any designated root trust authority.

Figure 4:
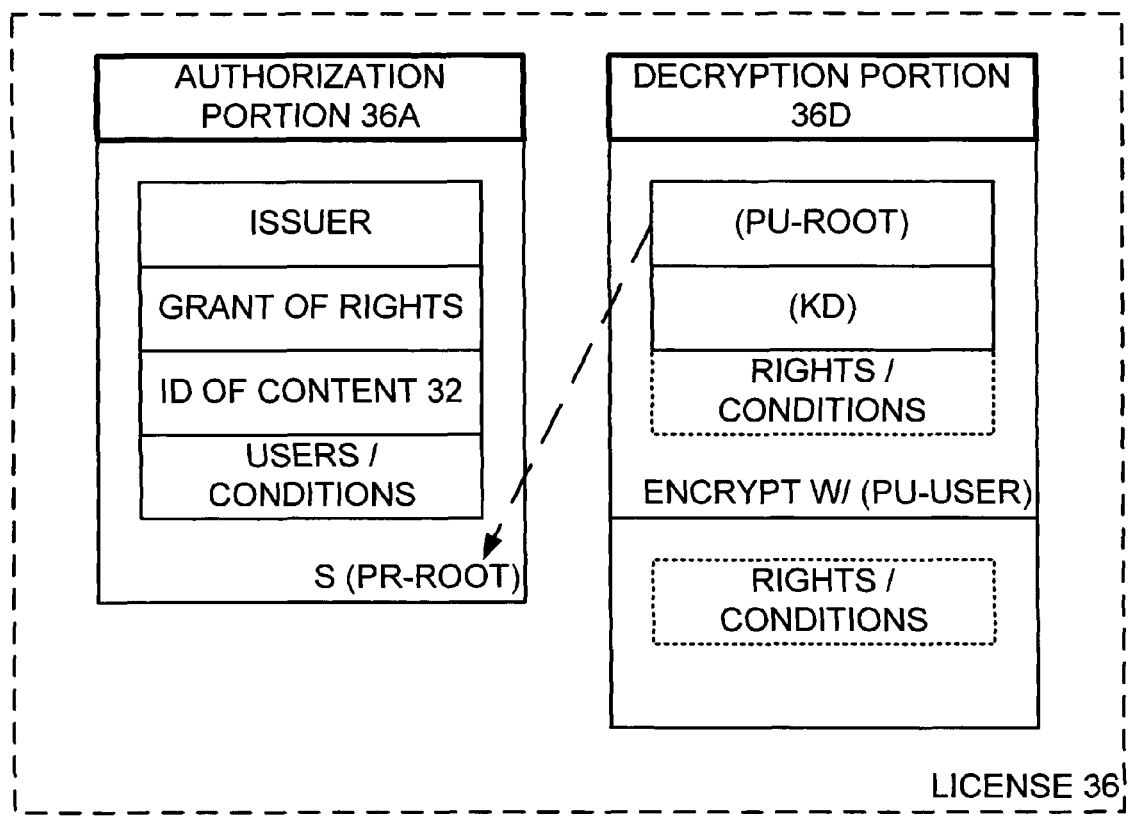
FIG. 4 is a block diagram showing the license of FIG. 3 in more detail and including an authorization portion and a decryption portion in accordance with one embodiment of the present invention.

Note, though, that including the public key of a root trust authority with a license 36 that is to be validated thereby in essence makes the license 36 self-validating, which as should be appreciated is not usually acceptable as a security practice. Accordingly, in one embodiment of the present, and as seen in FIG. 4, the license 36 is separated into at least two portions including a decryption portion 36*d* and an authorization portion 36*a*, each of which must be possessed by a user attempting to employ such license 36 to render corresponding content 32. Significantly, the decryption portion 36*d* should be accessible only by the user for whom the license 36 is issued, while the authorization portion 36*a* can be accessible by others but has a signature that is validated with information in the decryption portion 36*d*. Thus, with such portions 36*a*, 36*d*, the authorization portion 36*a* is not self-validating. Note that the license 36 may have other portions without departing from the spirit and scope of the present invention.

In one embodiment of the present invention, and still referring to FIG. 4, the authorization portion 36*a* of a license 36 identifies the issuer of the license 36, includes a specific grant of rights, such as for example to render a piece of content 32 in one or more particular manners, to issue a type of license 36, etc., and may include an identification of the relevant content 32. In addition, the authorization portion 36*a* may specify one or more particular users or types of users that can use the authorization portion 36*a* of the license 36, and for each specified user/type of user conditions that must be satisfied in connection with use of the license 36.

Significantly, the authorization portion 36*a* includes a digital signature based on at least a portion of the aforementioned items, where the signature leads back to a particular root trust authority having a particular public/private key pair (PU-ROOT, PR-ROOT). That is, and as should be appreciated, the signature (S (PR-ROOT)) may be based on PR-ROOT or may include a chain of certificates leading back to a last certificate with a signature based on PR-ROOT. In any case, and as should also be appreciated, the signature (S (PR-ROOT)) may be validated based on appropriate application of (PU-ROOT) either directly or by way of the chain of certificates, whichever the case may be.

Note, though, that the authorization portion 36*a* does not itself contain such (PU-ROOT). Instead, in one embodiment of the present invention, the decryption portion 36*d* contains the root key (PU-ROOT), along with the decryption key (KD) for decrypting the corresponding content 32. In addition, the decryption portion 36*d* may include other rights and conditions in addition to the rights and conditions set forth in the authorization portion 36*a*. Most significantly, the decryption portion 36*d* should express as a right/condition that the decryption key (KD) therein cannot be employed unless the root key (PU-ROOT) therein is employed to validate the signature on the corresponding authorization portion 36*a*.

The decryption portion 36*d* likely is not digitally signed, although such a digital signature may be provided without departing from the spirit and scope of the present invention. As may be appreciated, if signed, such signature likely would have to be validated based on (PU-ROOT) assuming the validating root key should not be tied to the user's computing device 34. However, and again, including (PU-ROOT) within the decryption portion 36*d* where such decryption portion 36*d* is validated based on such (PU-ROOT) makes the decryption portion 36d self-validating, which as should be appreciated is not usually acceptable as a security practice.

Instead, in one embodiment of the present invention, the decryption portion 36d is encrypted to protect the keys therein, where the encrypting key is selected such that the corresponding decrypting key is available to the user's computing device 34. As may be appreciated, doing so has the benefit that the decrypting portion 36d is tied to the user's computing device 34 by way of such decrypting key. As may also be appreciated, doing so has the additional benefit that the decrypting key may be any of several keys as long as such decrypting key is available to the user's computing device 34.

For example, in one embodiment of the present invention, the decrypting key is a private key corresponding to a public key that is employed as the encrypting key, as is shown in FIG. 4. Thus, the user's computing device 34 may itself have such a public/private key pair, or may have access to a public/private key pair of the user itself, or the trusted component 38 on the user's computing device 34 may have such a public/private key pair. In any such situation, the public key is provided to the constructor of the license 36 and in particular of the decryption portion 36d for use in encrypting same, while the private key is held in confidence for decrypting the decryption portion 36d.

Alternatively, the decrypting key and the encrypting key may be the same, in which case such constructor and the user's computing device 34 may establish a shared secret for generating such a symmetric key (not shown). Of course, the user's computing device would then have to securely store such a symmetric key for future retrieval.

Figure 5:
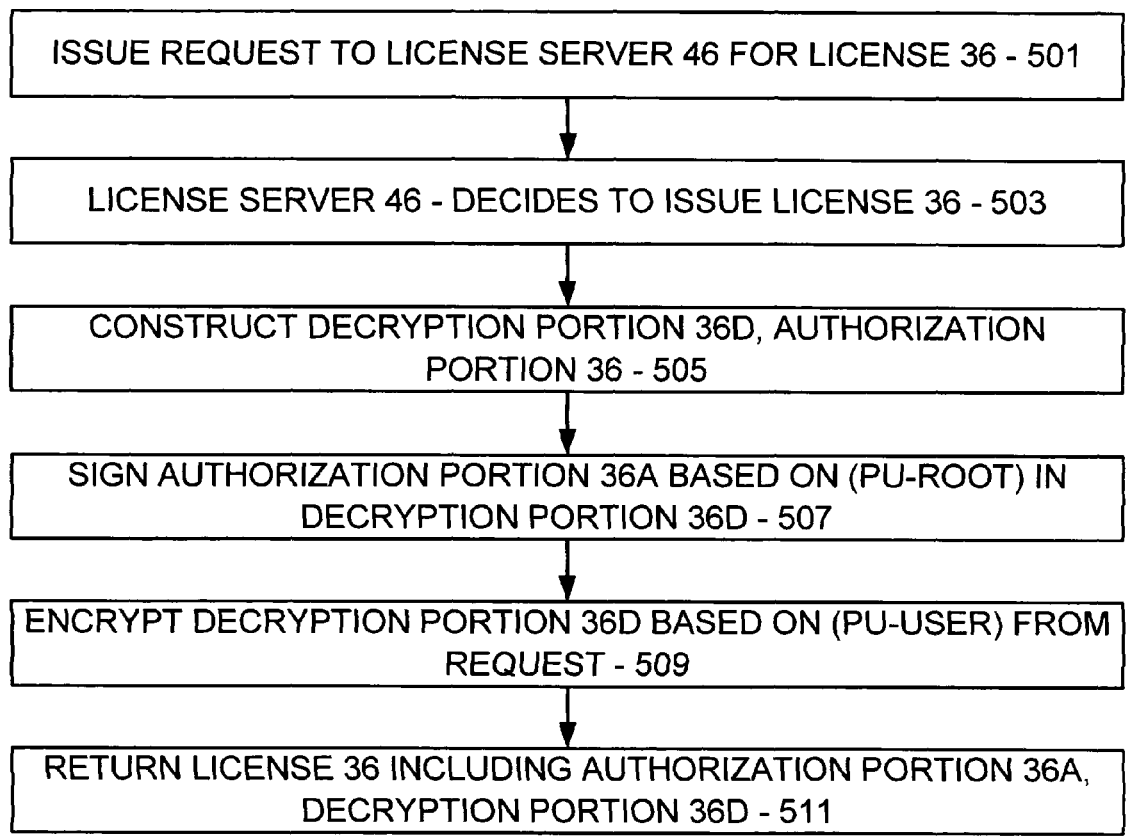
FIG. 5 is a flow diagram showing key steps performed during issuance of the license of FIGS. 3 and 4 in accordance with one embodiment of the present invention.

Turning now to FIG. 5, with the arrangement thus far set forth above and in connection with FIGS. 3 and 4, rendering content 32 on a user's computing device 34 is achieved in the following manner. Preliminarily, based on some appropriate identification within the content 32, the user's computing device 34 and the trusted component 38 thereon are directed to a license server such as the licensor 46 of FIG. 3 that can issue a license 36 corresponding to the content, and a request is issued to such license server 46 for such license 36 (step 501). Typically, such a request includes a certificate or the like that identifies either the user, the user's computing device 34, the trusted component 38, or the like, where the certificate includes therein a public key (PU-USER). Based on the request including the certificate, then, the license server 46 decides whether to issue a license 36 in response. As may be appreciated, such decision may be based on any appropriate factors without departing from the spirit and scope of the present invention.

Presuming that the license server 46 in fact decides to issue the license 36 (step 503), such license server constructs the decryption portion 36d and the authorization portion 36 in the form set forth above (step 505), signs the authorization portion 36a based on the root key (PU-ROOT) in the decryption portion 36d (step 507), and encrypts the decryption portion 36d based on the public key (PU-USER) of the certificate with the request (step 509). Note here that each request as at step 501 includes a differing public key (PU-USER), where such (PU-USER) is employed to encrypt the decryption portion 36d of the requested license 36, and accordingly, each decryption portion 36d correspondingly differs. However, the authorization portion 36a likely does not likewise differ in that such authorization portion should be signed to be validated based on the same root key (PU-ROOT). Accordingly, it may in fact be the case that a differing decryption portion 36d is constructed as at step 505 and encrypted as at step 509 in response to each request, but that only a single common authorization portion 36a is constructed as at step 505 and signed as at step 507, and the single authorization portion 36a is applicable to all requests.

At any rate, the license server 46 in response to the request from the user's computing device 34 returns thereto the license 36 including the authorization portion 36a and the decryption portion 36d (step 511). Note, though, that the authorization portion 36a need not necessarily be specific to any particular license 36 and accordingly may in fact be common to multiple licenses 36. Accordingly, it may in fact be the case that a decryption portion 36d is constructed as at step 505 in response to each request, but that an authorization portion 36a is constructed as at step 505 only if the requestor does not already possess such authorization portion 36a. Correspondingly, if the requestor does in fact already possess such authorization portion 36a, the license server 46 need not construct same as at step 505 and need not return same as at step 511.

Figure 6:
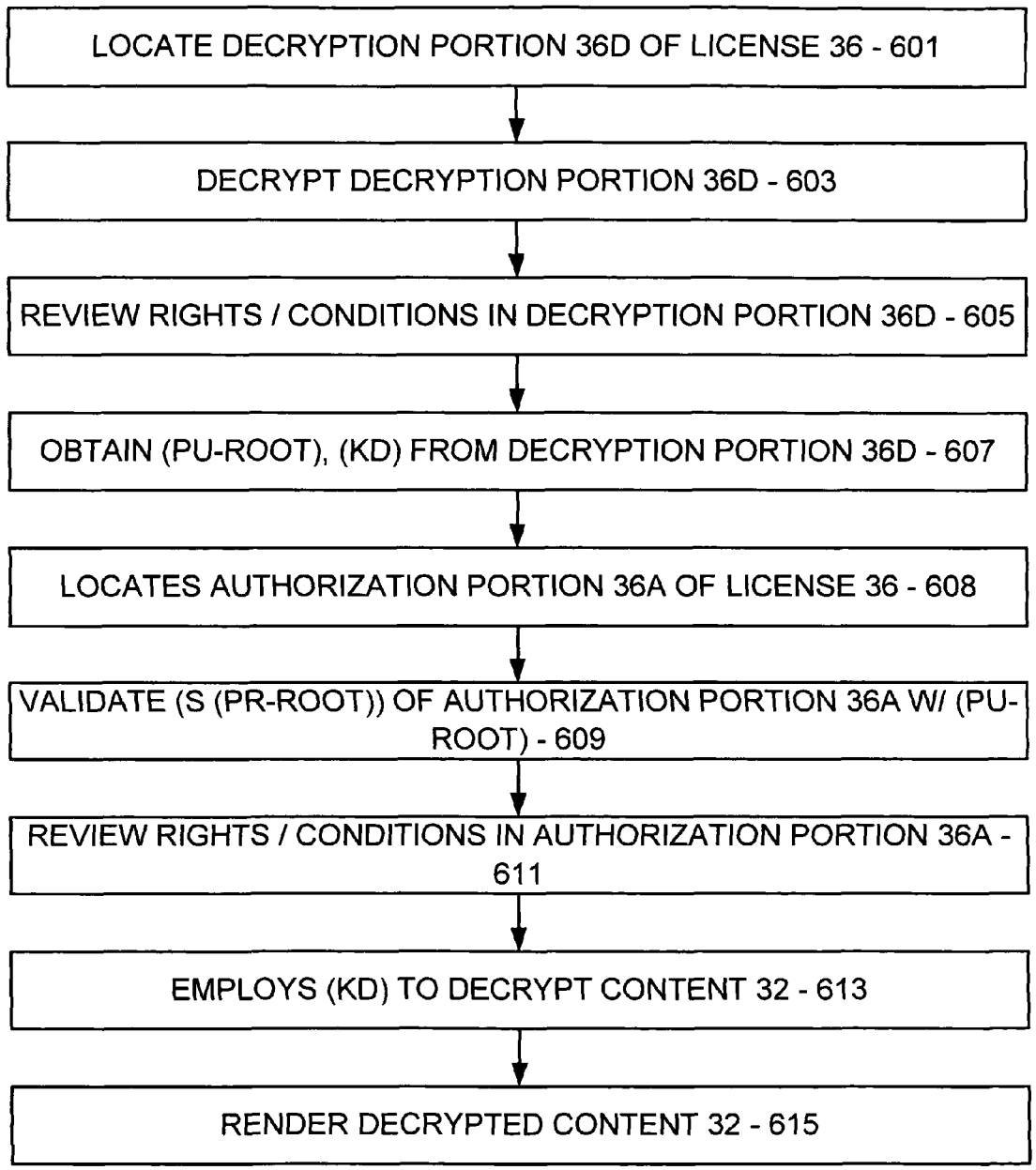
FIG. 6 is a flow diagram showing key steps performed when employing the license of FIGS. 3 and 4 to render content in accordance with one embodiment of the present invention.

Turning now to FIG. 6, it is seen that a user's computing device 34 in possession of a decryption portion 36d and an authorization portion 36a of a license 36 corresponding to encrypted content 32 decrypts and renders such content 32 in the following manner.

Preliminarily, based on the content 32, the user's computing device 34 locates the license 36, or at least the decryption portion 36d thereof (step 601). Thus, the user's computing device 34 decrypts same according to whatever encryption scheme has been employed to encrypt such decryption portion 36d (step 603). For example, for example, if the decryption portion 36d or a portion thereof is encrypted based on the public key of the user (PU-USER), then the user's computing device 34 applies the corresponding private key (PR-USER) to reveal such decryption portion 36d or a portion thereof.

In addition, the user's computing device 34 reviews the rights/conditions set forth in the decryption portion 36d and determines whether such rights allow rendering of the content 32 in the manner sought and that such conditions are satisfied (step 605). Significantly, such determination includes ensuring that the decryption key (KD) in the decryption portion 36d is not employed unless the root key (PU-ROOT) therein is employed to validate the signature on the corresponding authorization portion 36a. Note that if it is the case that the rights/conditions are not encrypted within the decryption portion 36d, step 605 may take place before step 603 and step 603 may be avoided in the case where such rights/conditions do not allow rendering of the content 32 in the manner sought. Note, too, that if the rights/conditions or any other part of the decryption portion 36d are not encrypted, such parts should at least be the basis for a digital signature and such digital signature should be verified to ensure against tampering.

Presuming that the rights/conditions in the decryption portion 36d allow rendering of the content 32 in the manner sought, the user's computing device 34 obtains the root key (PU-ROOT), and the decryption key (KD) for decrypting the corresponding content 32 from the decryption portion 36d (step 607), locates the authorization portion 36a (step 608), and then employs such (PU-ROOT) to validate the digital signature (S (PR-ROOT)) of the authorization portion 36a (step 609). Such validating may be performed in any appropriate manner without departing from the spirit and scope of the present invention. Such validation is known or should be apparent to the relevant public and therefore need not be set forth herein in any detail.

Presuming that the validation succeeds, the user's computing device 34 then may review the rights/conditions set forth in the authorization portion 36a and determine whether such rights allow rendering of the content 32 in the manner sought and that such conditions are satisfied (step 611). Note that step 611 may take place before step 609 and step 609 may be avoided in the case where such rights/conditions do not allow rendering of the content 32 in the manner sought.

Presuming that the rights/conditions in the authorization portion 36a allow rendering of the content 32 in the manner sought, the user's computing device 34 employs the decryption key (KD) as obtained at step 607 to in fact decrypt the encrypted content 32 (step 613), and then renders such decrypted content 32 (step 615).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a flexible architecture is provided to define a digital license 36 and the operation thereof. The architecture allows for multiple root trust authorities and allows a license 36 to itself specify each root trust authority that can be employed to authenticate/verify same. To effectuate such architecture, the license 36 includes a decryption portion 36d encrypted in a manner accessible only by a particular user or group of users, and an authorization portion 36a that must be validated based on a key obtained from the decryption portion 36d.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-implemented method of authorizing access to digital content on a computing device, the content being in an encrypted form and decryptable according to a decryption key (KD), the computer-implemented method comprising:
   the computing device obtaining a digital license corresponding to the content, the digital license being issued to the computing device having an authorization portion and a decryption portion wherein:
      the authorization portion sets forth rights granted in connection with the digital content, authorizes conditions that must be satisfied to exercise the rights granted, and has a digital signature based on a chain of certificates that lead back to a root trust authority identified in the decryption portion, wherein the root trust authority has a particular public/private key pair (PU-ROOT, PR-ROOT); and
      the decryption portion being accessible only by the computing device the license is issued to, having the decryption key (KD), having the identification of the root trust authority, and having the public key of the root trust authority (PU-ROOT), wherein the public key of the root trust authority (PU-ROOT) was obtained from the chain of certificates that lead back to the root trust authority;
   the computing device accessing the decryption portion;
   the computing device obtaining the decryption key (KD) and the root trust authority public key (PU-ROOT) from the accessed decryption portion;
   the computing device validating the digital signature of the authorization portion by applying the public key (PU-ROOT) of the root trust authority to the digital signature;
   the computing device verifying that the authorization conditions in the authorization portion allow the exercise of rights in the authorization portion;
   the computing device verifying that the digital signature has been validated before the decryption key (KD) is employed; and
   the computing device exercising the rights in the authorization portion by employing the decryption key (KD) to decrypt the encrypted content,
   wherein the license need not be tied to any particular root trust authority.

2. The method of claim 1 wherein the decryption portion is at least partially encrypted in a form decryptable by the computing device that the license was issued to, the method further comprising accessing the decryption portion by decrypting the at least partially encrypted decryption portion.

3. The method of claim 2 wherein the decryption portion is at least partially encrypted according to a shared secret known to the computing device that the license was issued to, the method further comprising accessing the decryption portion by decrypting the at least partially encrypted decryption portion according to the shared secret.

4. The method of claim 2 wherein the computing device that was issued the license has a public/private key pair (PU-USER, PR-USER), the decryption portion is at least partially encrypted according to (PU-USER), the method comprising accessing the decryption portion by applying (PR-USER) thereto to decrypt the at least partially encrypted decryption portion.

5. The method of claim 1 wherein the decryption portion has conditions that must be satisfied, the method further comprising examining the conditions set forth in the decryption portion and determining that such conditions are satisfied.

6. A computer-readable storage medium having computer-executable instructions stored thereon that, when processed by a processor, implement a method for authorizing access to digital content on a computing device, the content being in an encrypted form and decryptable according to a decryption key (KD), the method comprising:
   obtaining a digital license corresponding to the content, the digital license being issued to the computing device having an authorization portion and a decryption portion wherein:
      the authorization portion sets forth rights granted in connection with the digital content, authorizes conditions that must be satisfied to exercise the rights granted, a digital signature based on a chain of certificates that lead back to a root trust authority identified in the decryption portion, wherein the root trust authority has a particular public/private key pair (PU-ROOT, PR-ROOT); and
      the decryption portion being accessible only by the computing device the license is issued to, having the decryption key (KD), having the identification of the root trust authority, and having the public key of the root trust authority (PU-ROOT), wherein the public key of the root trust authority (PU-ROOT) was obtained from the chain of certificates that lead back to the root trust authority;
   accessing the decryption portion;
   obtaining the decryption key (KD) and the root trust authority public key (PU-ROOT) from the accessed decryption portion;

validating the digital signature of the authorization portion, by applying the public key (PU-ROOT) of the root trust authority to the digital signature;

verifying that the authorization conditions in the authorization portion allow the exercise of rights in the authorization portion; and verifying that the digital signature has been validated before the decryption key (KD) is employed; and exercising the rights in the authorization portion by employing the decryption key (KD) to decrypt the encrypted content, wherein the license need not be tied to any particular root trust authority.

7. The medium of claim 6 wherein the decryption portion is a separate digital structure from the authorization portion.

8. The medium of claim 6 wherein the authorization portion of the license specifies at least one particular computing device or type of computing device that can use such authorization portion, and for each specified computing device/type of computing device conditions that must be satisfied to exercise the rights granted.

9. The medium of claim 6 wherein the decryption portion has conditions that must be satisfied including a condition that the decryption key (KD) therein can only be employed to decrypt encrypted digital content after the digital signature, within the authorization portion, is validated.

10. The medium of claim 6 wherein the decryption portion has conditions that must be satisfied including a condition that the rights granted in the authorization portion can only be exercised if the conditions set forth in the authorization portion are satisfied.

11. The medium of claim 6 wherein the decryption portion is at least partially encrypted in a form decryptable by the computing device to whom the license is issued.

12. The medium of claim 11 wherein the decryption portion is at least partially encrypted according to a shared secret known to the computing device to which the license is issued.

13. The medium of claim 11 wherein the user computing device that was issued to has a public/private key pair (PU-USER, PR-USER), the decryption portion is at least partially encrypted according to (PU-USER), and (PR-USER) is applied to decrypt the encrypted decryption portion.

* * * * *